United States Patent
Xu

(10) Patent No.: US 9,416,971 B2
(45) Date of Patent: Aug. 16, 2016

(54) MULTIPLE DIFFUSING COOLING HOLE

(75) Inventor: JinQuan Xu, Groton, CT (US)

(73) Assignee: United Technologies Corporation, Hartford, CT (US)

(*) Notice: Subject to any disclaimer, the term of this patent is extended or adjusted under 35 U.S.C. 154(b) by 1070 days.

(21) Appl. No.: 13/544,098

(22) Filed: Jul. 9, 2012

(65) Prior Publication Data
US 2013/0209234 A1 Aug. 15, 2013

Related U.S. Application Data

(60) Provisional application No. 61/599,384, filed on Feb. 15, 2012.

(51) Int. Cl.
| | | |
|---|---|---|
| F01D 5/18 | (2006.01) | |
| F23R 3/06 | (2006.01) | |
| F01D 9/06 | (2006.01) | |

(52) U.S. Cl.
CPC . *F23R 3/06* (2013.01); *F01D 5/186* (2013.01); *F01D 9/065* (2013.01); *F05D 2240/81* (2013.01); *F05D 2260/202* (2013.01); *F23R 2900/03042* (2013.01); *Y02T 50/676* (2013.01)

(58) Field of Classification Search
CPC .......... F01D 5/186; F01D 5/187; F01D 9/06; F01D 5/12; F05D 2240/81; F05D 2260/202; F23R 3/06; F23R 2900/03042
USPC .................... 415/115; 416/96 R, 97 R, 193 A
See application file for complete search history.

(56) References Cited

U.S. PATENT DOCUMENTS

| | | | |
|---|---|---|---|
| 4,197,443 | A | 4/1980 | Sidenstick |
| 4,529,358 | A | 7/1985 | Papell |
| 4,622,821 | A | 11/1986 | Madden |
| 4,653,279 | A | 3/1987 | Reynolds |
| 4,653,983 | A | 3/1987 | Vehr |
| 4,672,727 | A | 6/1987 | Field |
| 4,684,323 | A | 8/1987 | Field |
| 4,700,544 | A | 10/1987 | Fucci |

(Continued)

FOREIGN PATENT DOCUMENTS

| | | |
|---|---|---|
| EP | 1326007 A2 | 7/2003 |
| EP | 1609949 A1 | 12/2005 |
| EP | 1698757 A2 | 9/2006 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Dwayne J White
*Assistant Examiner* — Danielle M Christensen
(74) *Attorney, Agent, or Firm* — Kinney & Lange, P.A.

(57) ABSTRACT

A gas turbine engine component includes a wall having first and second wall surfaces and a cooling hole extending through the wall. The cooling hole includes an inlet located at the first wall surface, an outlet located at the second wall surface, a metering section extending downstream from the inlet, a first diffusing section extending downstream from the metering section, and a second diffusing section extending downstream from the first diffusing section to the outlet. The second diffusing section includes first and second lobes, each lobe diverging longitudinally and laterally relative to the metering section, and a trailing edge.

8 Claims, 8 Drawing Sheets

(56) References Cited

U.S. PATENT DOCUMENTS

| | | |
|---|---|---|
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,066,484 B1 | 11/2011 | Liang |
| 8,087,893 B1 | 1/2012 | Liang |
| 2001/0036401 A1 | 11/2001 | Harvey et al. |
| 2002/0159888 A1 | 10/2002 | Rinck et al. |
| 2005/0042074 A1* | 2/2005 | Liang ............................ 415/115 |
| 2005/0106020 A1 | 5/2005 | Bunker et al. |
| 2005/0135931 A1* | 6/2005 | Nakamata et al. .......... 416/97 R |
| 2008/0003096 A1 | 1/2008 | Kohli et al. |
| 2008/0145208 A1 | 6/2008 | Klasing et al. |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0068068 A1* | 3/2010 | Liang ........................ 416/97 R |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |
| 2012/0167389 A1 | 7/2012 | Lacy et al. |

OTHER PUBLICATIONS

The International Search Report & Written Opinion mailed Jun. 2, 2013 for International Application No. PCT/US2013/025691.

* cited by examiner

MULTIPLE DIFFUSING COOLING HOLE

CROSS-REFERENCE TO RELATED APPLICATION

This application claims priority to U.S. Provisional Application No. 61/599,384, filed on Feb. 15, 2012 and entitled "MULTIPLE DIFFUSING COOLING HOLE", the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes a wall having first and second wall surfaces and a cooling hole extending through the wall. The cooling hole includes an inlet located at the first wall surface, an outlet located at the second wall surface, a metering section extending downstream from the inlet, a first diffusing section extending downstream from the metering section, and a second diffusing section extending downstream from the first diffusing section to the outlet. The second diffusing section includes first and second lobes, each lobe diverging longitudinally and laterally relative to the first metering section, and a trailing edge.

A gas path wall of a component of a gas turbine engine includes first and second wall surfaces, an inlet located at the first wall surface, an outlet located at the second wall surface, a metering section commencing at the inlet and extending downstream from the inlet, a first diffusing section extending downstream from the metering section, and a second diffusing section extending from the first diffusing section and terminating at the outlet. The second diffusing section includes a first lobe diverging longitudinally and laterally relative to the metering section, a second lobe diverging longitudinally and laterally relative to the metering section, and a trailing edge.

DETAILED DESCRIPTION

Figure 1:
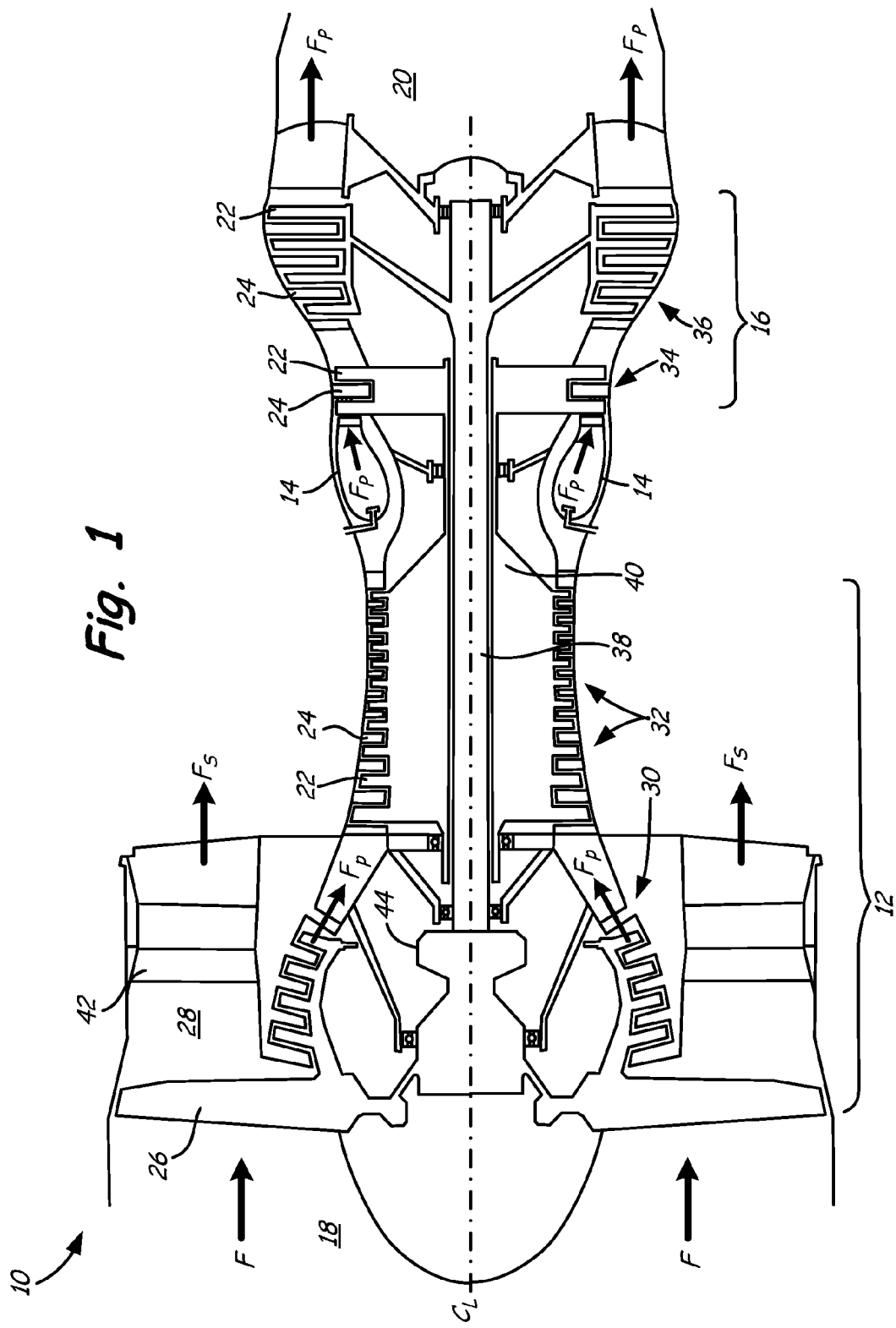
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
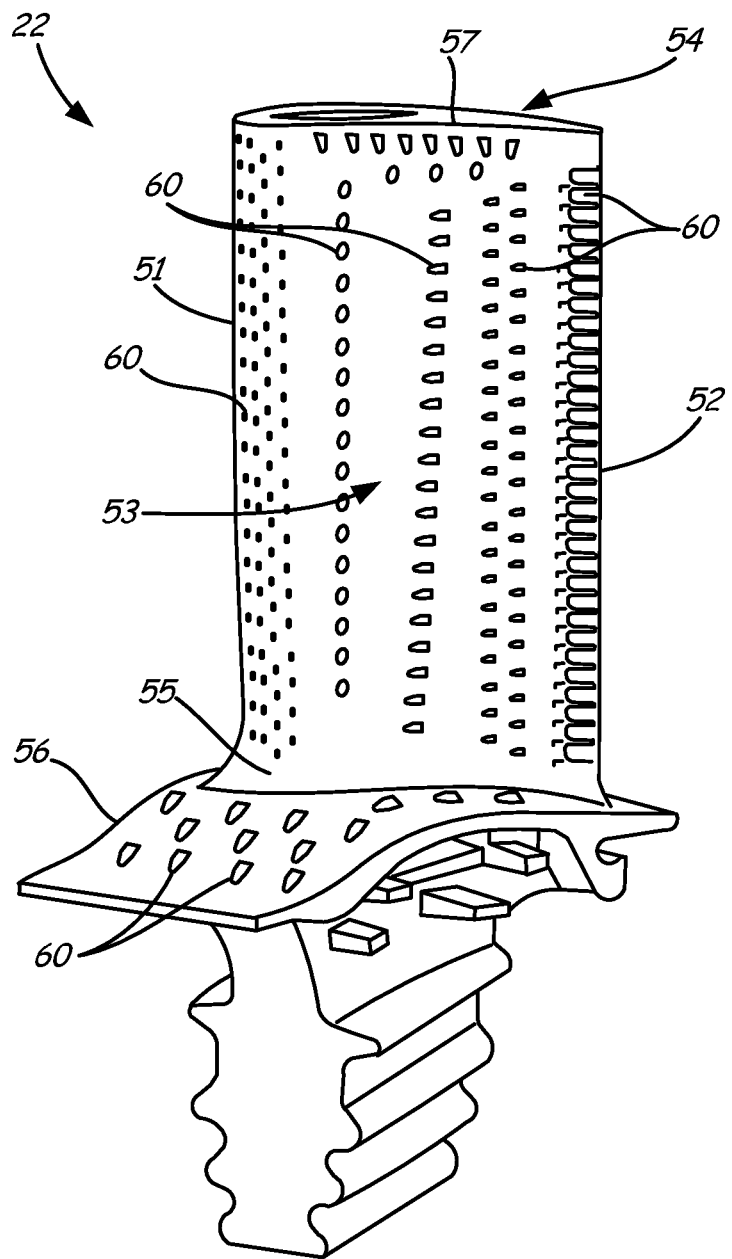
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
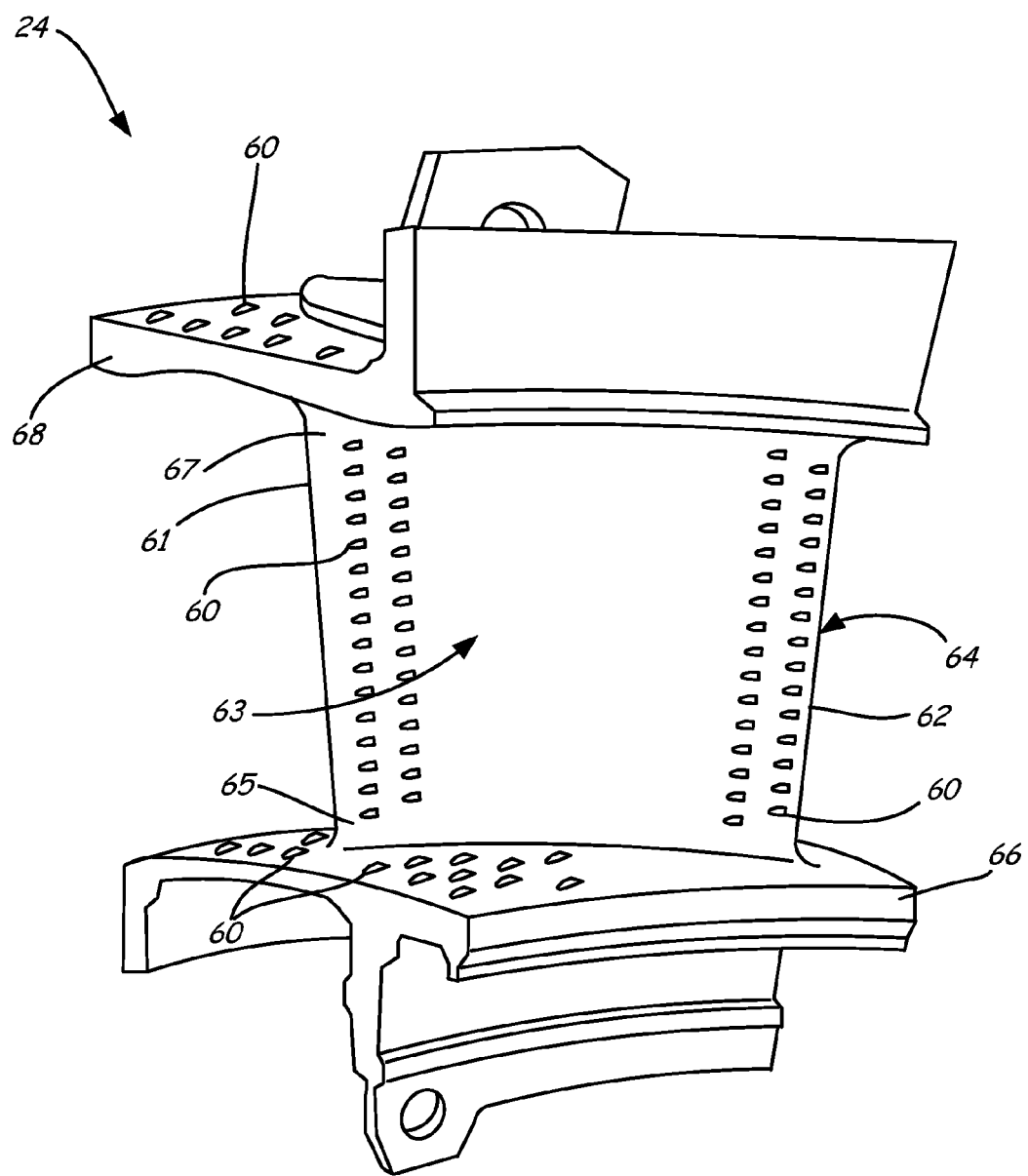
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The multiple diffusing cooling holes described herein provide a cooling solution that offers improved film cooling coverage and eliminates or reduces the problems associated with conventional diffusion film cooling holes, such as flow separation and blow off. Cooling holes with multiple diffusing sections are able to provide a wider spanwise film of cooling air, improved film effectiveness and reduce the likelihood of film separation.

Figure 3:
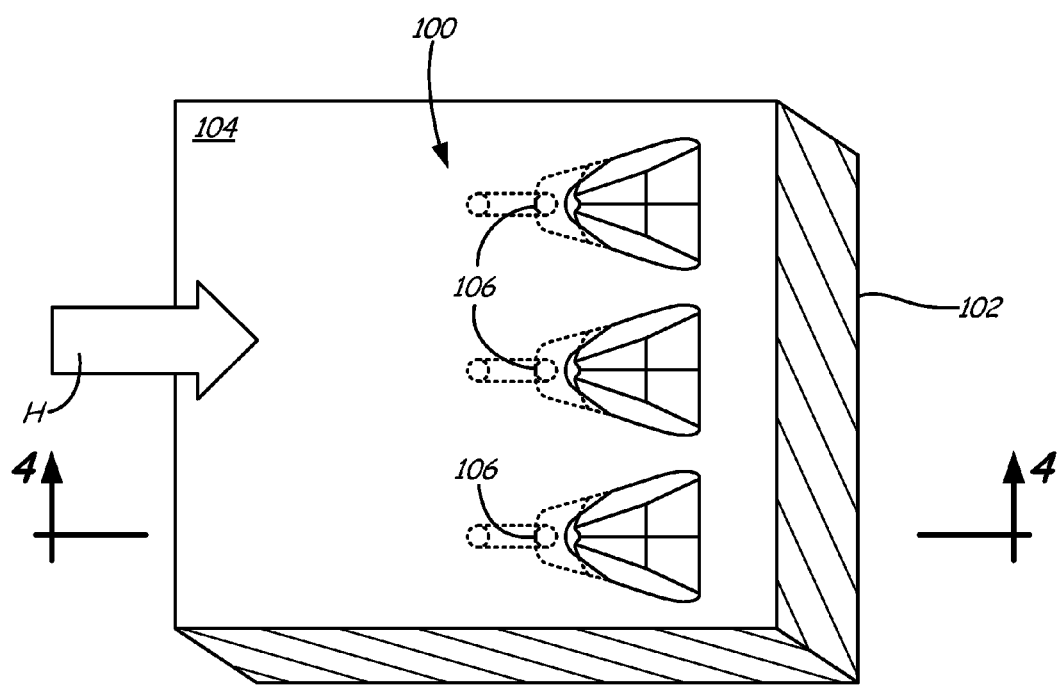
FIG. 3 is a view of a wall having cooling holes with multiple diffusing sections.

FIG. 3 illustrates a view of a wall having multiple diffusing cooling holes. Wall 100 includes first wall surface 102 and second wall surface 104. As described in greater detail below, wall 100 is metallic and second wall surface 104 can include a thermal barrier coating. Cooling holes 106 are oriented so that their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104.

As described below in greater detail, cooling air flows out of cooling holes 106, with cooling air flowing through each of the lobes in the diffusing section. Cooling holes 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along second wall surface 104 (represented by arrow H). Here, the row of cooling holes 106 is substantially perpendicular to the direction of flow H. In alternate embodiments, the orientation of cooling holes 106 can be arranged on second wall surface 104 so that the flow of cooling air is substantially perpendicular to the high temperature gas flow (i.e. cooling air exits cooling holes 106 radially) or at an angle between parallel and perpendicular (compound angle). Cooling holes 106 can also be provided in a staggered formation or other formation on wall 100. Cooling holes 106 can be located on a variety of components that require cooling. Suitable components include, but are not limited to, turbine vanes and blades, combustors, blade outer air seals, and augmentors, etc. Cooling holes 106 can be located on the pressure side or suction side of vanes and blades. Cooling holes 106 can also be located on the blade tip or blade or vane platforms.

Figure 4:
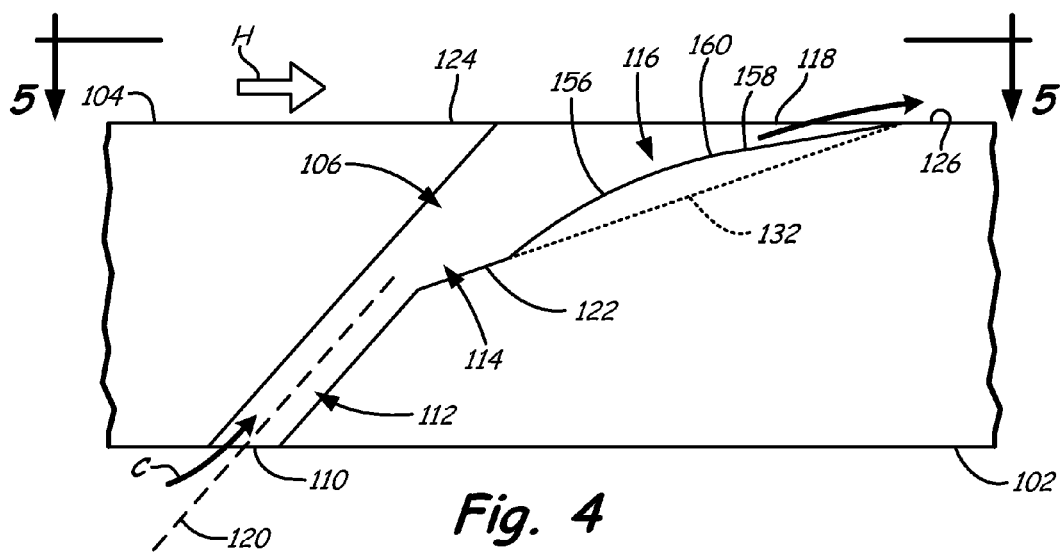
FIG. 4 is a sectional view of the cooling hole of FIG. 3 taken along the line 4-4.
Figure 5:
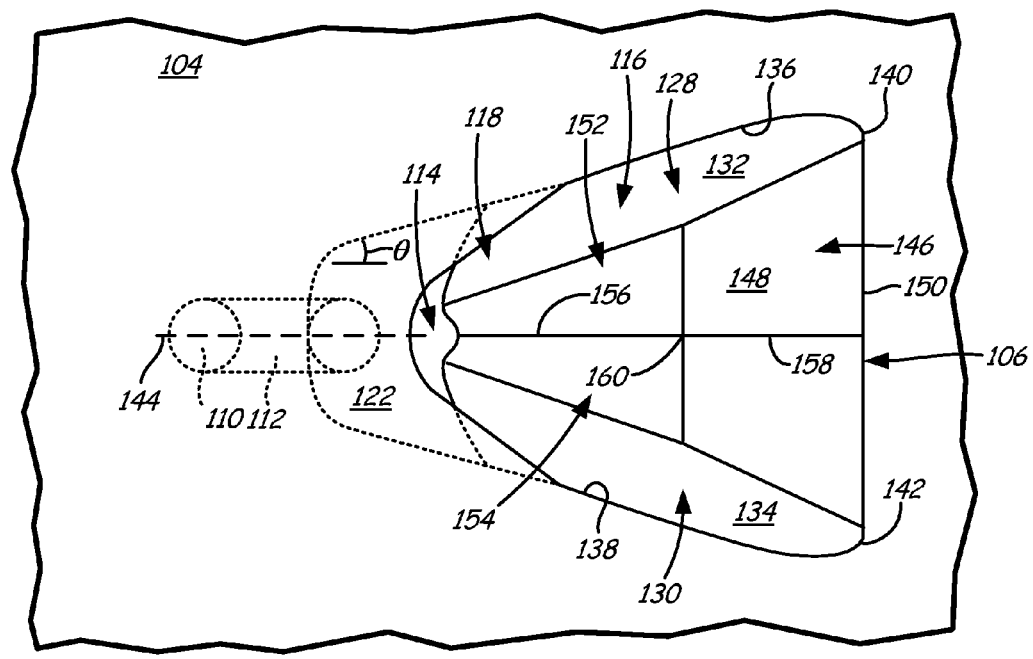
FIG. 5 is a view of the cooling hole of FIG. 4 taken along the line 5-5.

FIGS. 4 and 5 illustrate one embodiment of cooling hole 106 in greater detail. FIG. 4 illustrates a sectional view of multi-lobed film cooling hole 106 of FIG. 3 taken along the line 4-4. FIG. 5 illustrates a view of cooling hole 106 of FIG. 4 taken along the line 5-5. Cooling hole 106 includes inlet 110, metering section 112, first diffusing section 114, second diffusing section 116 and outlet 118. Inlet 110 is an opening located on first wall surface 102. Cooling air C enters cooling hole 106 through inlet 110 and passes through metering section 112, first diffusing section 114 and second diffusing section 116 before exiting cooling hole 106 at outlet 118 along second wall surface 104.

Metering section 112 is adjacent to and downstream from inlet 110 and controls (meters) the flow of air through cooling hole 106. In exemplary embodiments, metering section 112 has a substantially constant flow area from inlet 110 to first diffusing section 114. In some embodiments, metering section 112 has a converging/diverging feature as described in U.S. Provisional Application No. 61/599,359, filed on Feb. 15, 2012 and entitled "GAS TURBINE ENGINE COMPONENT WITH CONVERGIN/DIVERGIN COOLING PASSAGE", which is incorporated by reference. Metering section 112 can have circular, oblong (oval or elliptical), racetrack (oval with two parallel sides having straight portions), crescent, cusp or dual-cusp shaped axial cross sections. In FIGS. 4 and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \le l \le 3d$. That is, the length of metering section 112 is between one and three times its diameter. The length of metering section 112 can exceed 3d, reaching upwards of 30d. In alternate embodiments, metering section 112 has a non-circular cross section, such as an oblong, racetrack-shaped, crescent, cusp or dual-cusp shaped cross section, and their metering sections 112 have a length l and hydraulic diameter $d_h$. In some embodiments, metering section 112 has a length l according to the relationship: $d_h \leq l \leq 3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 120.

First diffusing section 114 is adjacent to and downstream from metering section 112. Cooling air C diffuses within first diffusing section 114 before continuing on to second diffusing section 116 and exiting cooling hole 106 along second wall surface 104. Once cooling air C exits metering section 112, the flow of air expands to fill first diffusing section 114. Cooling air C is diffuses both longitudinally (shown best in FIG. 4) and laterally (shown best in FIG. 5) in first diffusing section 114. In some embodiments, first diffusing section 114 is a conventional (for example, fan shaped) diffusing section such as those described in U.S. Pat. No. 4,684,323. In other words, the first diffusion section 114 doesn't contain any ridges or ribs. In these embodiments, first diffusing section 114 includes a substantially flat bottom surface (surface 122). In alternative embodiments, bottom surface 122 of first diffusing section 114 is curved (convex or concave) to encourage the attachment of cooling air C to bottom surface 122. Bottom surface 122 can be curved longitudinally or laterally. Whether first diffusing section 114 has a flat or curved bottom surface 122, first diffusing section 114 does not contain the ridges present in second diffusing section 116 (described in greater detail below). Cooling air C passes through first diffusing section 114 and enters second diffusing section 116. As the result of expansion in first diffusing section 114, cooling air C has expanded (diffused) prior to reaching second diffusing section 116.

Second diffusing section 116 is adjacent to and downstream from first diffusing section 114. Cooling air C continues to diffuse (expand) within second diffusing section 116 before exiting cooling hole 106 along outer wall surface 104. Second wall surface 104 includes upstream end 124 (upstream of cooling hole 106) and downstream end 126 (downstream from cooling hole 106). Second diffusing section 116 opens along second wall surface 104 between upstream end 124 and downstream end 126. As shown in FIG. 4, cooling air C continues to diffuse away from longitudinal axis 120 in second diffusing section 116 as it flows towards outlet 118.

As shown best in FIG. 5, second diffusing section 116 includes two channel-like lobes 128 and 130 as described in the U.S. Provisional Application No. 61/599,372, filed on Feb. 15, 2012 and entitled "MULTI-LOBED COOLING HOLE AND METHOD OF MANUFACTURE", which is incorporated by reference. Each lobe 128 and 130 has a bottom surface (bottom surfaces 132 and 134, respectively). Lobes 128 and 130 each have a side wall along the outer edge of second diffusing section 116 (side walls 136 and 138, respectively). Each lobe 128 and 130 also has a trailing edge (trailing edges 140 and 142, respectively).

Each lobe 128, 130 diverges longitudinally and laterally with respect to metering section 112 and has a bottom surface (bottom surfaces 132 and 134, respectively), a side wall along the outer edge of second diffusing section 116 (side walls 136 and 138, respectively) and a trailing edge (trailing edges 140 and 142, respectively). FIG. 4 best illustrates the longitudinal divergence (from longitudinal axis 120), while FIG. 5 best illustrates the lateral divergence (from centerline axis 144).

As shown in FIG. 5, first lobe 128 laterally diverges upwards from centerline axis 144 and second lobe 130 laterally diverges downwards from centerline axis 144. Cooling air C leaving first diffusing section 114 and entering second diffusing section 116 diffuses into lobes 128 and 130, causing the cooling air to spread laterally within second diffusing section 116. Because cooling air C has already expanded in first diffusing section 114, cooling air C more readily expands in second diffusing section 116. Side wall 136 and bottom surface 132 direct cooling air C through first lobe 128, and side wall 138 and bottom surface 134 direct cooling air C through second lobe 130.

Figure 6A:
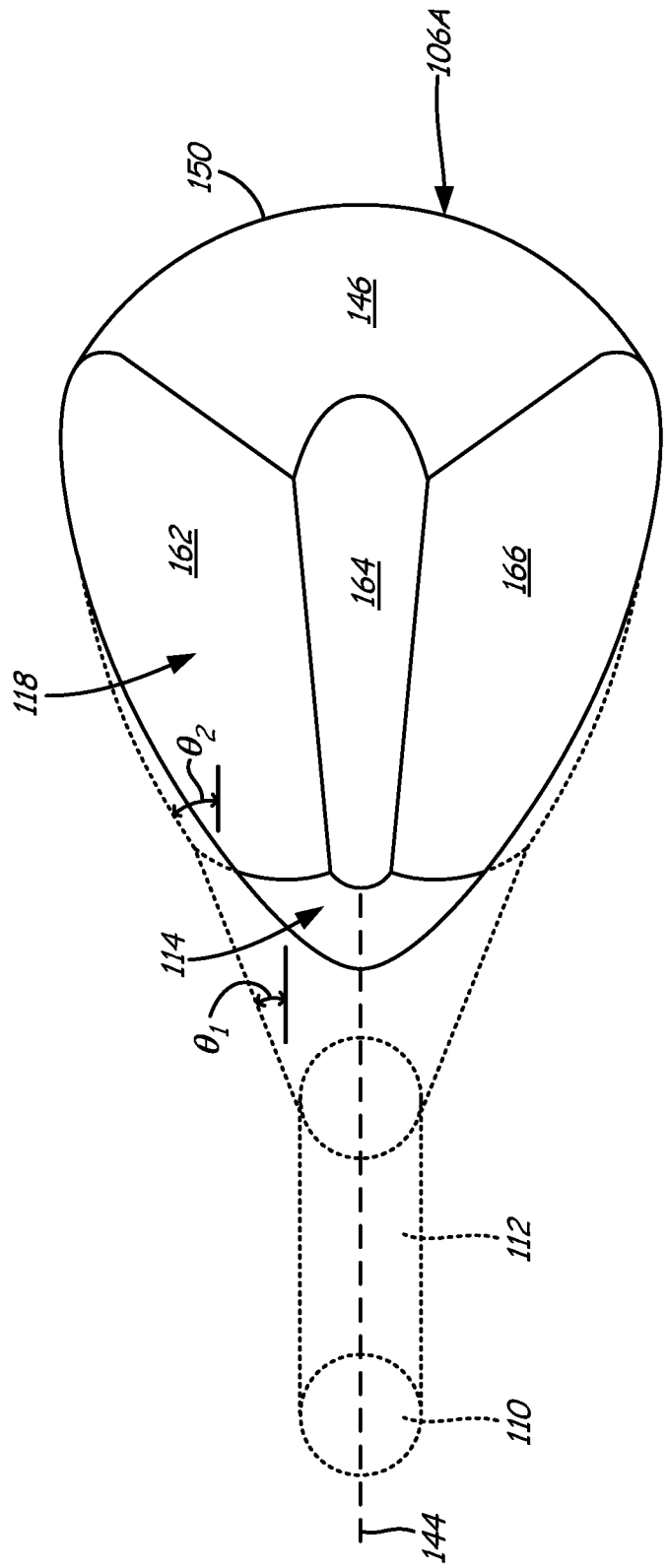
FIG. 6A is a plan view of another embodiment of a cooling hole with multiple diffusing sections.

In some embodiments, second diffusing section 116 also includes transition region 146. Portion 148 of transition region 146 is located between first lobe 128 and second lobe 130. End 150 of transition region 146 is adjacent outlet 118 where the outlet meets second wall surface 104. Portion 148, located between first lobe 128 and second lobe 130, can extend upstream towards first diffusing section 114 to varying degrees. The location of end 150 of transition region 146 relative to trailing edges 140 and 142 can also vary. In the embodiment shown in FIG. 5, end 150 meets trailing edges 140 and 142 of lobes 128 and 130, respectively at outlet 118. In this embodiment, trailing edges 140 and 142 and hence, first lobe 128 and second lobe 130, extend to outlet 118 at second wall surface 104. In other embodiments, end 150 of transition region 146 is spaced from trailing edges 140 and 142. In these embodiments, trailing edges 140 and 142 and hence, first lobe 128 and second lobe 130, do not extend to outlet 118 at second wall surface 104. End 150 of transition region 146 can be straight as shown in FIG. 5 or curved (e.g., concave as shown in FIG. 6A).

In the embodiment illustrated in FIG. 5, second diffusing section 116 also includes first inclined portion 152 and second inclined portion 154. First inclined portion 152 is located adjacent to and extends from bottom surface 132 of first lobe 128. First inclined portion 152 extends from first lobe 128 towards centerline axis 144 and second lobe 130. Second inclined portion 154 is located adjacent to and extends from bottom surface 134 of second lobe 130. Second inclined portion 154 extends from second lobe 130 towards centerline axis 144 and first lobe 128. Depending on the location of cooling hole 106, first inclined portion 152 and second inclined portion 154 can have varying lateral and longitudinal lengths and extend from lobes 128 and 130 at various angles (inclinations). Like the side walls and bottom surfaces, first and second inclined portions 152 and 154 direct cooling air C through lobes 128 and 130 of second diffusing section 116.

In some embodiments, first inclined portion 152 and second inclined portion 154 meet together to form ridge 156 as shown in FIG. 5. Ridge 156 is located between first lobe 128 and second lobe 130 at the intersection of first inclined portion 152 and second inclined portion 154. Ridge 156 aids in separating and directing the flow of cooling air C into first lobe 128 and second lobe 130. The location and angle of ridge 156 within second diffusing section 116 can vary to direct cooling air C within second diffusing section 116 to suit the location and desired flow profile of cooling hole 106.

Ridge 156 can extend longitudinally to varying degrees between first diffusing section 114 and transition region 146. Ridge 156 can extend upstream all the way to first diffusing section 114, beginning where first diffusing section 114 and second diffusing section 116 meet as shown in FIG. 4. Alternatively, ridge 156 can begin farther downstream (closer to outlet 118). Ridge 156 can extend downstream to transition region 146 as shown in FIG. 4. Alternatively, ridge 156 can converge with bottom surfaces 132 and 134 upstream of transition region 146. Corresponding changes to the longitudinal lengths of first inclined portion 152 and second inclined portion 154 must accompany any change in the longitudinal extension of ridge 156. As shown in FIG. 4, ridge 156 does not extend to outlet 118.

Transition region 146 can take various shapes and have different configurations depending on the location and desired flow profile of cooling hole 106. The bottom surface of transition region 146 can be flat or curved. A curved (for example, longitudinally convex) bottom surface of transition region 146 can facilitate improved flow attachment. Transition region 146 can have a compound trapezoidal shape as shown in FIG. 5. In some embodiments, ridge 158 separates transition region 146 into two sides having surfaces in two different planes. Ridge 158 converges with bottom surface 134 of second lobe 130 at outlet 118 at second wall surface 104 as shown in FIG. 4. The intersection of ridges 156 and 158 at the point where transition region 146 meets first inclined portion 152 and second inclined portion 154 forms apex 160. By forming apex 160 upstream of outlet 118, second diffusing section 116 facilitates improved flow attachment.

While FIG. 5 shows second diffusing section 116 having two lobes, second diffusing section 116 can also have other numbers of lobes as described in U.S. Provisional Application No. 61/599,381, filed on Feb. 15, 2012 and entitled "TRI-LOBED COOLING HOLE AND METHOD OF MANUFACTURE", U.S. Provisional Application No. 61/599,379, filed on Feb. 15, 2012 and entitled "MULTI-LOBED COOLING HOLE AND METHOD OF MANUFACTURE", and U.S. application Ser. No. 13/544,274, filed on Jul. 9, 2012 and entitled "GAS TURBINE ENGINE COMPONENT WITH MULTI-LOBED COOLING HOLE", which are incorporated by reference. FIG. 6A shows a plan view of one embodiment of cooling hole 106A having three lobes (162, 164 and 166) in second diffusing section 116. Cooling hole 106A also illustrates curved end 150 of transition region 146. It is understood that a cooling hole may have more than three lobes in second diffusion section 116.

By locating two diffusing sections (first diffusing section 114 and second diffusing section 116) in cooling hole 106, a (laterally) wider film of cooling air can be formed than a cooling hole with only a single diffusing section. Additionally, two diffusing sections also allow cooling air C to be better aligned laterally with the high temperature gases flowing near the component. Cooling air C expands laterally when it reaches first diffusing section 114, filling the spaces between the side walls of first diffusing section 114. Once cooling air C reaches second diffusing section 116, it expands again, directed by first lobe 128 and second lobe 130. The combination of the two diffusing sections allows second diffusing section 116 to expand laterally to a greater degree. Conventional diffusing sections can expand cooling air C only so much before the flow separates. Flow separation occurs when the film of cooling air is laterally spread too quickly, causing holes or gaps in the film to appear. As a result, the angle at which conventional diffusing sections typically diverge laterally is controlled. In some conventional diffusion cooling holes, the angle of divergence is around 10°. Combining first diffusing section 114 and second diffusing section 116 allows controlled and gradual lateral diffusion of cooling air C that minimizes flow separation. By combining first diffusing section 114 and second diffusing section 116, cooling hole 106 can diverge (referenced in FIG. 5 by θ) by as much as 60° at second diffusing section 116. In some embodiments, first diffusing section 114 and second diffusing section 116 diverge at equal angles as shown in FIG. 5. In alternative embodiments, second diffusing section 116 diverges at a greater angle ($\theta_2$) than first diffusing section 114 ($\theta_1$) as shown in FIG. 6A. In yet another embodiment, second diffusing section 116 diverges at a smaller angle ($\theta_2$) than the first diffusing section 114 ($\theta_1$).

Figure 6B:
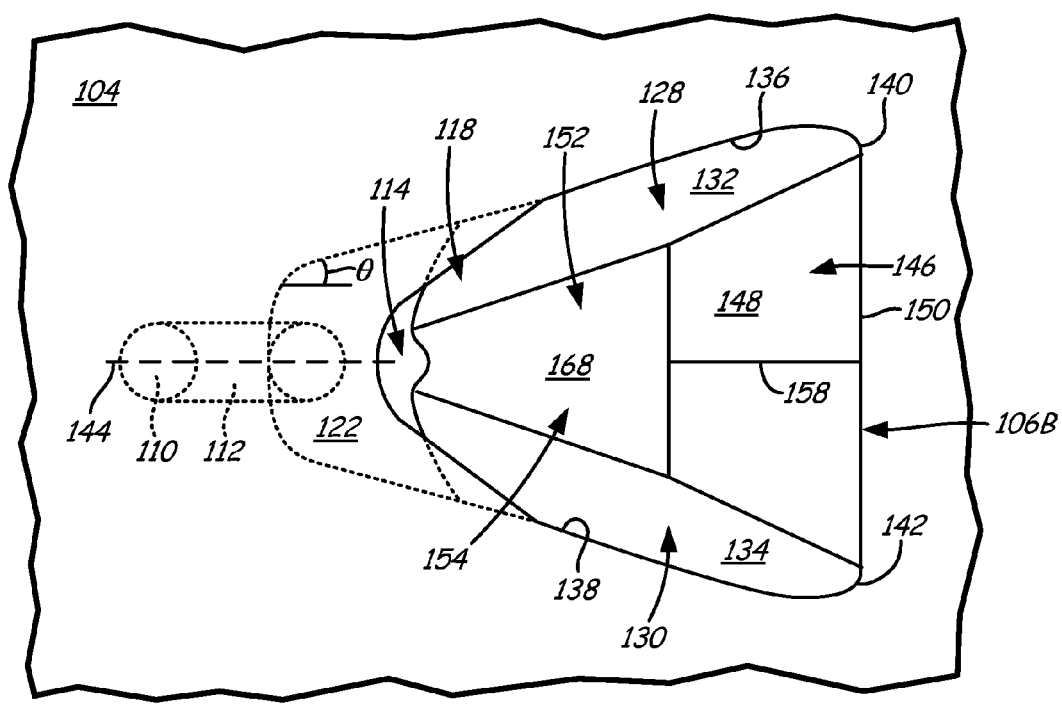
FIG. 6B is a plan view of another embodiment of a cooling hole with multiple diffusing sections.

FIG. 6B shows a plan view of another embodiment of cooling hole 106 having a central portion flush with the lobes of the second diffusing section. Cooling hole 106B includes central portion 168. In cooling hole 106B, no ridge separates first lobe 128 and second lobe 130 upstream of transition region 146. Instead, central portion 168 is located between lobes 128 and 130. Central portion 168 can be flush with bottom surfaces 132 and 134 of lobes 128 and 130 respectively. Central portion 168 can be flat or curved (convex or concave) in the longitudinal or lateral direction. Central portion 168 extends from first diffusing section 114 to transition region 146. Transition region 146 can include ridge 158 (as shown in FIG. 6B) or ridge 158 can be omitted.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 7A:
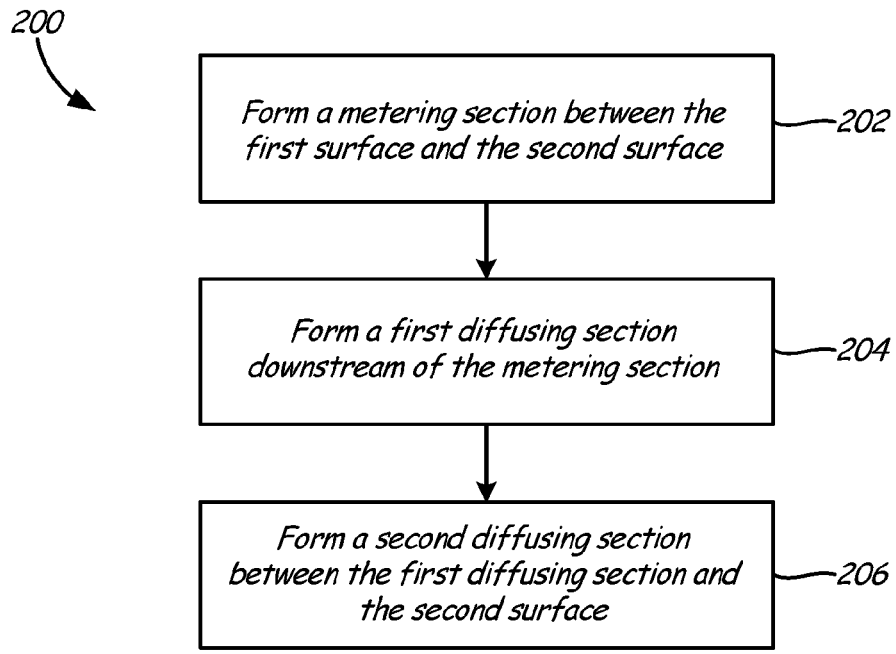
FIG. 7A is a simplified flow diagram illustrating one embodiment of a method for producing a cooling hole with multiple diffusing sections in a gas turbine engine wall.

FIG. 7A is a simplified flow diagram illustrating one embodiment of a method for producing a cooling hole having multiple diffusing sections in a gas turbine engine wall having first and second wall surfaces. Method 200 includes forming a metering section between the first and second surfaces (step 202), forming a first diffusing section downstream of the metering section (step 204), and forming a second diffusing section between the first diffusing section and the second surface (step 206). Metering section meters a flow of fluid through the cooling hole and is formed in step 202 by one or more of the casting, machining or drilling techniques described above. The technique(s) chosen is/are typically determined based on performance, reproducibility and cost. In embodiments where step 202 occurs prior to steps 204 and 206, inlet 110 and portions of first diffusing section 114, second diffusing section 116 and outlet 118 can also be formed during formation of metering section 112. First diffusing section 114 allows the fluid entering the first diffusing section from the metering section to expand and is formed in step 204 by one or more of the casting, machining or drilling techniques described above. As with metering section 112, the technique(s) chosen is/are typically determined based on performance, reproducibility and cost. Second diffusing section 116 includes a plurality of lobes and distributes the flow of the fluid into the lobes to form a film of cooling fluid at a hole outlet at the second surface of the gas turbine engine wall. Second diffusing section 116 is formed in step 206 so that lobes diverge laterally and/or longitudinally relative to the metering section.

Figure 7B:
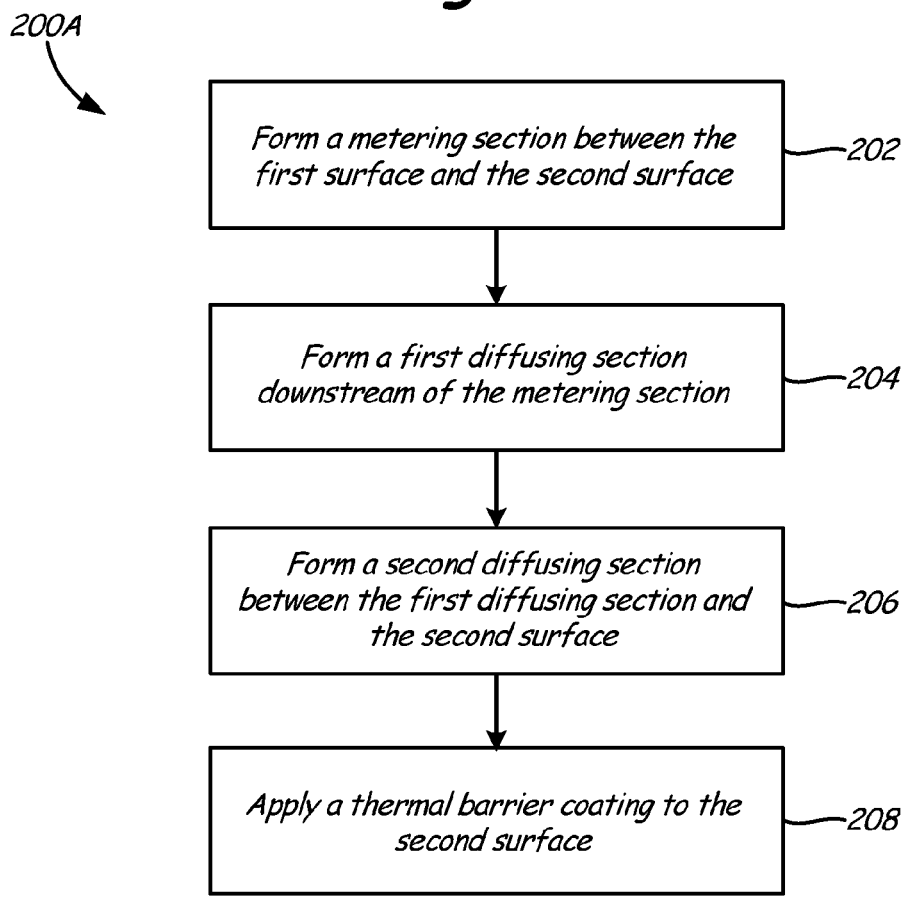
FIG. 7B is a simplified flow diagram illustrating another embodiment of a method for producing a cooling hole with multiple diffusing sections in a gas turbine engine wall.

In embodiments where step 202 occurs prior to steps 204 and 206, outlet 118 is fully formed once steps 204 and 206 have been completed. Method 200 can be performed before or after an optional thermal barrier coating application. In optional step 208 (shown as a step in method 200A in FIG. 7B), a thermal barrier coating is applied to second wall surface 104. Application of the thermal barrier coating can also include the application of a bond coating prior to the thermal barrier coating. The steps of method 200A can be performed in any order depending on the location of cooling hole 106 and the locations of first diffusing section 114 and second diffusing section 116 relative to the metallic wall and the thermal barrier coating. As previously stated, the order of the steps can affect the machining or drilling techniques chosen.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a wall having first and second wall surfaces and a cooling hole extending through the wall. The cooling hole can include an inlet located at the first wall surface, an outlet located at the second wall surface, a metering section extending downstream from the inlet, a first diffusing section extending downstream from the metering section, and a second diffusing section extending downstream from the first diffusing section to the outlet. The second diffusing section can include first and second lobes, each lobe diverging longitudinally and laterally relative to the metering section, and a trailing edge.

The system of the preceding paragraph can optionally include, additionally and/or alternatively any, one or more of the following features, configurations and/or additional components:

the first diffusing section may not contain ridges or ribs;

the first diffusing section can diverge laterally at a first angle, and the second diffusing section can diverge laterally at a second angle larger than the first angle;

the trailing edge of the second diffusing section can be straight;

the trailing edge of the second diffusing section can be curved;

the second diffusing section can further include a middle lobe located between the first and second lobes, and the middle lobe can diverge longitudinally relative to the first metering section;

the second diffusing section can further include a transition region having a portion that extends between the first and second lobes, the transition region having an end adjacent the outlet;

the first diffusing section can be substantially flat;

the first diffusing section can be fan shaped;

the first diffusing section can include a curved surface; and/or the second diffusing section can further include a central portion extending between and adjacent to each of the first and second lobes.

A wall of a component of a gas turbine engine can include first and second wall surfaces, an inlet located at the first wall surface, an outlet located at the second wall surface, a metering section commencing at the inlet and extending downstream from the inlet, a first diffusing section extending downstream from the metering section, and a second diffusing section extending from the first diffusing section and terminating at the outlet. The second diffusing section can include a first lobe diverging longitudinally and laterally relative to the metering section, a second lobe diverging longitudinally and laterally relative to the metering section, and a trailing edge.

The system of the preceding paragraph can optionally include, additionally and/or alternatively any, one or more of the following features, configurations and/or additional components:

the first diffusing section may not contain ridges or ribs;

the first diffusing section can diverge at a first angle, and the second diffusing section can diverge at a second angle different from the first angle;

the trailing edge of the second diffusing section can be straight;

the trailing edge of the second diffusing section can be curved;

the second diffusing section can further include a middle lobe located between the first and second lobes, and the middle lobe can diverge longitudinally relative to the metering section;

the second diffusing section can further include a transition region having a portion that extends between the first and second lobes, the transition region having an end adjacent the outlet;

the first diffusing section can be substantially flat;

the first diffusing section can include a curved surface; and/or the second diffusing section can further include a central portion extending between and adjacent to each of the first and second lobes.

The invention claimed is:

1. A gas turbine engine component comprising:
   a wall having first and second surfaces, wherein the second surface is exposed to hot gas flow, and wherein the wall defines a cooling hole extending through the wall from an inlet located at the first surface to an outlet located at the second surface, the cooling hole having:
      a metering section extending downstream from the inlet;
      a first diffusing section extending downstream from the metering section; and
      a second diffusing section extending downstream from the first diffusing section to the outlet, the second diffusing section comprising:
         a first lobe diverging longitudinally and laterally with respect to the metering section and having a trailing edge;
         a second lobe diverging longitudinally and laterally with respect to the metering section and having a trailing edge;
         one or more longitudinal ridges extending along the second diffusing section between the first and second lobes such that together the one or more longitudinal ridges extend from the first diffusing section to the outlet; and
         a downstream end located at the outlet, wherein the downstream end extends in a straight and lateral direction from an end of the first lobe to an end of the second lobe, and wherein the downstream end is at least axially coextensive with the trailing edges of the first and second lobes.

2. The component of claim 1, wherein the first diffusing section does not contain ridges or ribs.

3. The component of claim 1, wherein the second diffusing section further comprises:
   a middle lobe located between the first and second lobes, wherein the middle lobe diverges longitudinally relative to the metering section.

4. The component of claim 1, wherein the second diffusing section further comprises:
   a transition region having a portion that extends between the first and second lobes, the transition region having an end adjacent the outlet.

5. The component of claim 1, wherein the first diffusing section is substantially flat.

6. The component of claim 1, wherein the first diffusing section is fan shaped.

7. The component of claim 1, wherein the first diffusing section comprises a curved surface.

8. The component of claim 1, wherein the second diffusing section further comprises a central portion extending between and adjacent to each of the first and second lobes.

* * * * *